INVENTOR.
Warren A. Alexander,
BY John B. Davidson
ATTORNEY.

*INVENTOR.*
Warren A. Alexander,

United States Patent Office 3,439,155
Patented Apr. 15, 1969

3,439,155
FILTERING SYSTEM
Warren A. Alexander, Houston, Tex., assignor to Esso Production Research Company, a corporation of Delaware
Original application May 1, 1963, Ser. No. 277,192, now Patent No. 3,204,248, dated Aug. 31, 1965. Divided and this application Mar. 29, 1965, Ser. No. 443,569
Int. Cl. G06g 7/19; G06f 15/34
U.S. Cl. 235—181      2 Claims

ABSTRACT OF THE DISCLOSURE

In the optical filtering of a first function with a second function, undesirable cross products are eliminated by preparing optical record traces of the two functions in which variations in amplitude are indicated by variations in light transmissivity along a time-related axis, preparing negatives of each of the two optical records, optically convolving the records to obtain a first convoluted record by optically multiplying each increment of one with the entirety of the other, and summing the products so obtained in variable light transmissivity form, repeating the process for the negatives formed as described above, and optically adding the two convoluted records to obtain a final filtered record. There is also described a process for using the above technique to perform a frequency analysis of a time-related function.

---

This application is a division of application Ser. No. 277,192 of Warren A. Alexander, filed May 1, 1963, now Patent 3,204,248 for "Filtering System."

This application relates to the art of filtering. It relates especially to the art of optical filtering. It is more specially concerned with the optical filtering of seismic signals.

The method commonly employed for searching for petroleum or other mineral deposits is that known as seismic prospecting wherein a seismic disturbance is initiated at a selected point in or near the earth's surface to direct seismic waves downwardly into the earth from that point. The waves continue to travel downwardly within the earth until they encounter discontinuities in the earth's structure and composition in the form of various substrata formations and the like. These discontinuities have the effect of reflecting a portion of the seismic waves back toward the surface of the earth. Sensitive pickups, sometimes called seismic detectors, seismometers, transducers or geophones, are arranged at a plurality of points along the earth to translate the detected earth motion into electrical impulses which, after suitable amplification, are recorded. The signal recorded then is usually indicative of the character of the ground motion and of the position of the reflecting beds and are usually referred to collectively as a seismic signal which is in effect a composite signal made up of a plurality of electrical signals varying in frequency and amplitude. The electrical signals oscillate about a no-signal zero voltage or quiescent record base line. The seismic signal thus detected and recorded is then processed and displayed in various ways.

The recorded reflections are usually spaced so closely together and the reflection patterns from a number of discontinuities are superimposed to the extent that they are sometimes nearly hidden in the composite seismic signal originally recorded. Such a complex signal is most difficult to interpret. Therefore, various procedures have been tried and used with some success, to improve the usefulness of the seismic signals which have been recorded. Some of the procedures which have been tried include filters, different ways of arranging the individual geophones within an array of geophones, etc. These techniques have greatly improved the usefulness of data obtained from seismic records. One of the most useful of these procedures is the use of filters which ordinarily are of the electronic variety. These electronic filters are useful in correlating one signal or function with another function. The usefulness of such electronic filters is usually at least partially offset by the high cost of processing the individual functions into the filter.

The present invention is concerned with an optical filtering system. In this invention a first filter function $f_1(t)$ is displayed as a time function recorded in variable density form and is used for producing a filtering action on a second function $f_2(t)$ which is also displayed in a variable density form. Variable density normally means the display of a signal such as a seismic signal in a manner such that the intensity of the display is a function of the amplitude of the seismic signal. The signal is usually displayed in a straight channel of uniform width.

Various objects and a complete understanding of the invention can be had from the following description taken in conjunction with the drawing in which.

In this invention it is desired to use a first function such as $f_1(t)$ to filter a second function $f_2(t)$. This can also be expressed mathematically as a convolution as in Expression 1A.

(1A) $$\int_{-\infty}^{+\infty} f_1(t) f_2(\tau-t)\, dt$$

Quite frequently for simplicity, this convolution is expressed operationally as in the Expression 1B.

(1B) $$f_1(t) \otimes f_2(\tau-t)$$

Figure 2:
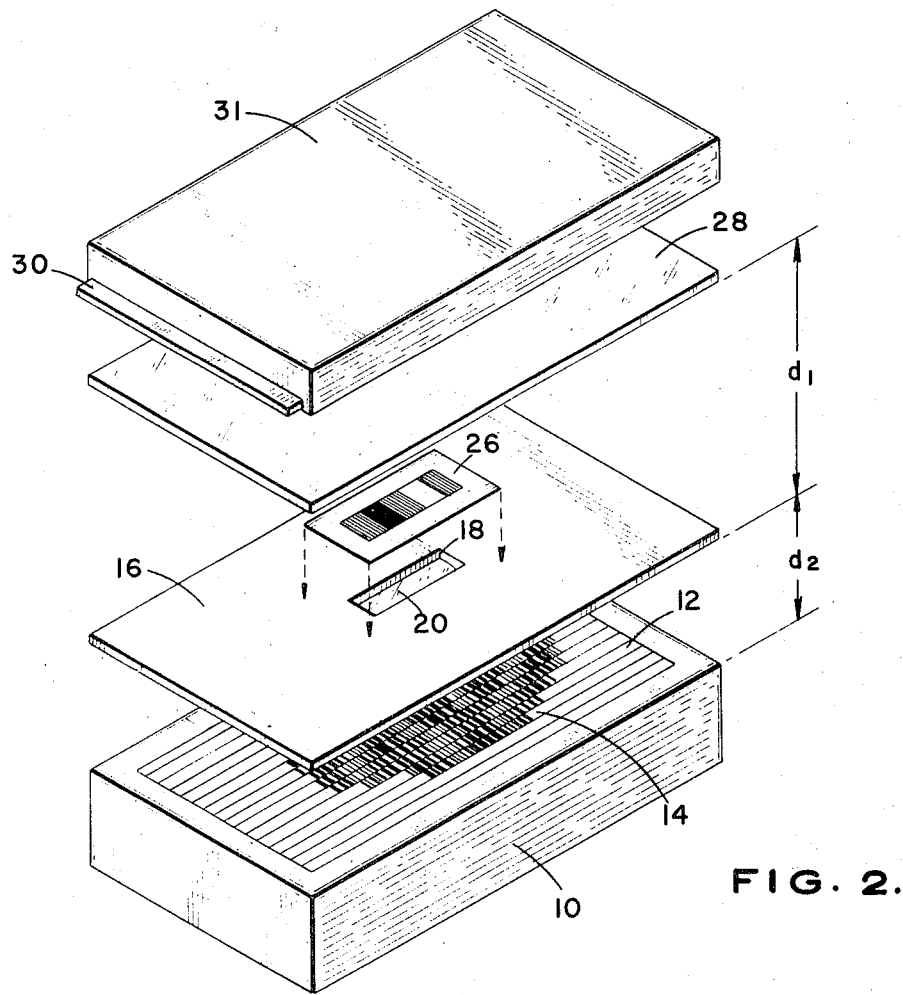
FIG. 2 illustrates one embodiment of an apparatus for filtering one function by a second function.

The apparatus of FIG. 2 is used to obtain this convolution function $$f_1(t) \otimes f_2(t)$$

Figure 2B:
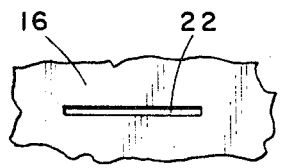
FIG. 2B is a fragmentary portion of the light shield of FIG. 2 showing a slit.
Figure 2C:
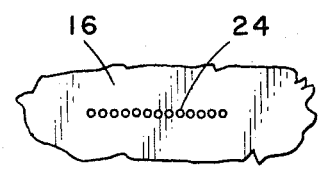
FIG. 2C is a fragmentary portion of the light shield of FIG. 2 showing a row of pinholes instead of a slit.

Shown thereon is a light table 10 which is of a character to have a wide area of uniform high-intensity light. The top of light table 10 is of a transparent material such as glass. Means are provided for placing a signal converted to variable density form such as film 12 on the surface of the top of the light table 10. A plurality of signals 14 are recorded in variable density form on film 12. By this it is meant that the intensity of the record is a function of the amplitude of the signal. Each signal is recorded in a channel and the density, i.e., the darkness or lightness of any portion of the channel is a function of its representative portion of the signal. Supported above light table 10 is an opaque light shield which has an opening 18 in which is mounted a cylindrical lens 20. The cylindrical lens passes therethrough a narrow line of light. The axis of the lens is in the same direction as the time axis of the signals 14. The cylindrical lens 20 gives an effect similar to that given by slit 22 shown in FIG 2B. Shown in FIG. 2C are a plurality of pinholes 24 which can, if desired, be used in place of slit 22. Placed immediately above cylindrical lens 20 is a mask 26 which has placed thereon the filter function $f_1(t)$. Spaced above and parallel to shield 16 is a ground glass 28 upon which the function $$f_1(t) \otimes f_2(t)$$

appears in variable density form. If desired, a film 30 supported by film holder 31 can be placed upon ground glass 28 and exposed and developed for a permanent record of the convoluted functions.

The spacing of light table 10 with respect to opaque shield 16 and ground glass 28 is arranged to obtain proper focus and size of the image. The size of the image appearing on the ground glass 28 with respect to the size of variable density film 12 is a function of the ratio of the distance $d_1$ between ground glass 28 and opaque screen 16 and $d_2$, the distance between opaque plate 16 and light table 10. The area or portion of $f_2(t)$ covered by filter $f_1(t)$ depends on the distance $d_1$, so the focal length of the lens 20 is also considered.

A few comments will now be given toward how this convolution occurs. First, it will be desired to consider the pinhole arrangement. If there is only one pinhole 24 in light shield 16, there will be one image of record 14 appearing upon ground glass 28. This is the principle of the pinhole camera. Two pinholes parallel to the time axis of the signal projects two images on the screen displaced one from another in an amount proportional to the separation of the pinholes. The number of projected images is increased to any number by increasing the number of pinholes. This is carried to the limit by using a slit to represent an infinite number of pinholes, thus an infinite number of images on the ground glass. It has been found that a cylindrical lens acts as a slit and projects a much sharper image. Thus it is preferred to use a cylindrical lens.

It is evident that the blackness of each projected image from each pinhole is proportional to the transmission of that portion of the mask or filter 26 which is placed over the pinhole. The projected image then from each pinhole is proportional to that portion of the mask placed over it. Thus, the final image on the screen is made up of the summation of all of the projected images. It follows then that if the mask over the pinholes or the cylindrical lens is a filter function, the final projected image is a filtered image of the original object, which in this case was signal 14.

The system of FIG. 2 gives very good results when used, for example, to multiply two positive values to give a positive product. However, the use of negative values introduces difficulties. This is due primarily to the manner in which the variable density data are generally recorded. In seismic operations, data in the variable density form are usually recorded as positive and negative values about a displaced zero; thus, there is a constant value K added to the function $f(t)$. That is, instead of being simply $f_1(t)$, it is actually $K+f_1(t)$ so that the function is always a positive value.

Figure 1:
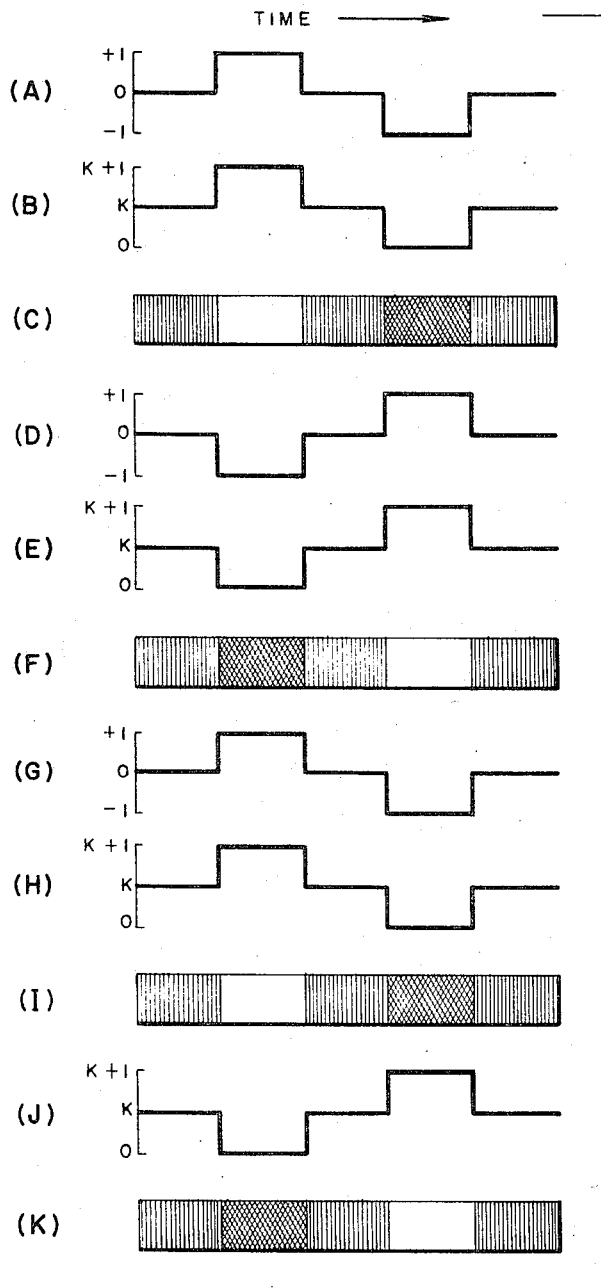
FIG. 1 is a family of curves useful in explaining the invention.

Attention is now directed toward the various curves of FIG. 1 to give a better understanding of the system involved. Curve A represents $f_1(t)$. It can be seen that this is a relatively simple curve having a positive pulse of amplitude and unity and a negative pulse of unity amplitude which is spaced therefrom. The various curves of FIG. 1 have the abscissa as time. As curve A has negative values, it must be modified so that it can be placed in variable density form. This is because there is no negative light. This transformation is shown in curve B which is given by the function $K+f_1(t)$ which is seen to be curve A with the constant K added thereto. The zero axis has, in effect, been lowered or reduced a value of K which is approximately equal to the lowest negative amplitude of interest of the curve A as clearly indicated in curve B.

Curve C is a variable density presentation of curve A in which the zero value of curve A has been given the value K or a gray color, +1 amplitude is clear and 0 is black, all as indicated in curve B.

In using the optical system to carry out a convolution, some objectionable extra terms appear in the results. In simple mathematical terms a convolution is $$(2) \qquad \frac{1}{2T} \int_{T_1}^{T_2} f_1(t) f_2(\tau - t) dt$$

In the optical case, because of K this becomes $$(3) \qquad \frac{1}{2T} \int_{T_1}^{T_2} [K+f_1(t)][K+f_2(\tau-t)]$$

After the indicated multiplication, 3 terms or components appear in Expression 4.

$$(4) \quad \underset{\text{component}}{\text{1st}} \qquad \text{2nd component} \qquad \text{3rd component}$$

$$\frac{1}{2T} \int_{T_1}^{T_2} K^2 dt + \frac{1}{2T} K \int_{T_1}^{T_2} [f_1(t)+f_2(\tau-t)]dt + \frac{1}{2T} \int_{T_1}^{T_2} f_1(t) f_2(\tau-t) dt$$

Of the three components in Expression 4, the last one $$\frac{1}{2T} \int_{T_1}^{T_2} f_1(t) f_2(\tau-t) dt$$

is what is desired, and the other two terms are objectionable to some extent.

Simplifying Expression 4, we have $$(5) \quad \frac{1}{2T} K^2 + \frac{K}{2T} \left[ \int_{T_1}^{T_2} f_1(t) dt + \int_{T_1}^{T_2} f_2(\tau-t) dt \right] + \frac{1}{2T} \int_{T_1}^{T_2} f_1(t) f_2(\tau-t) dt$$

Figure 3:
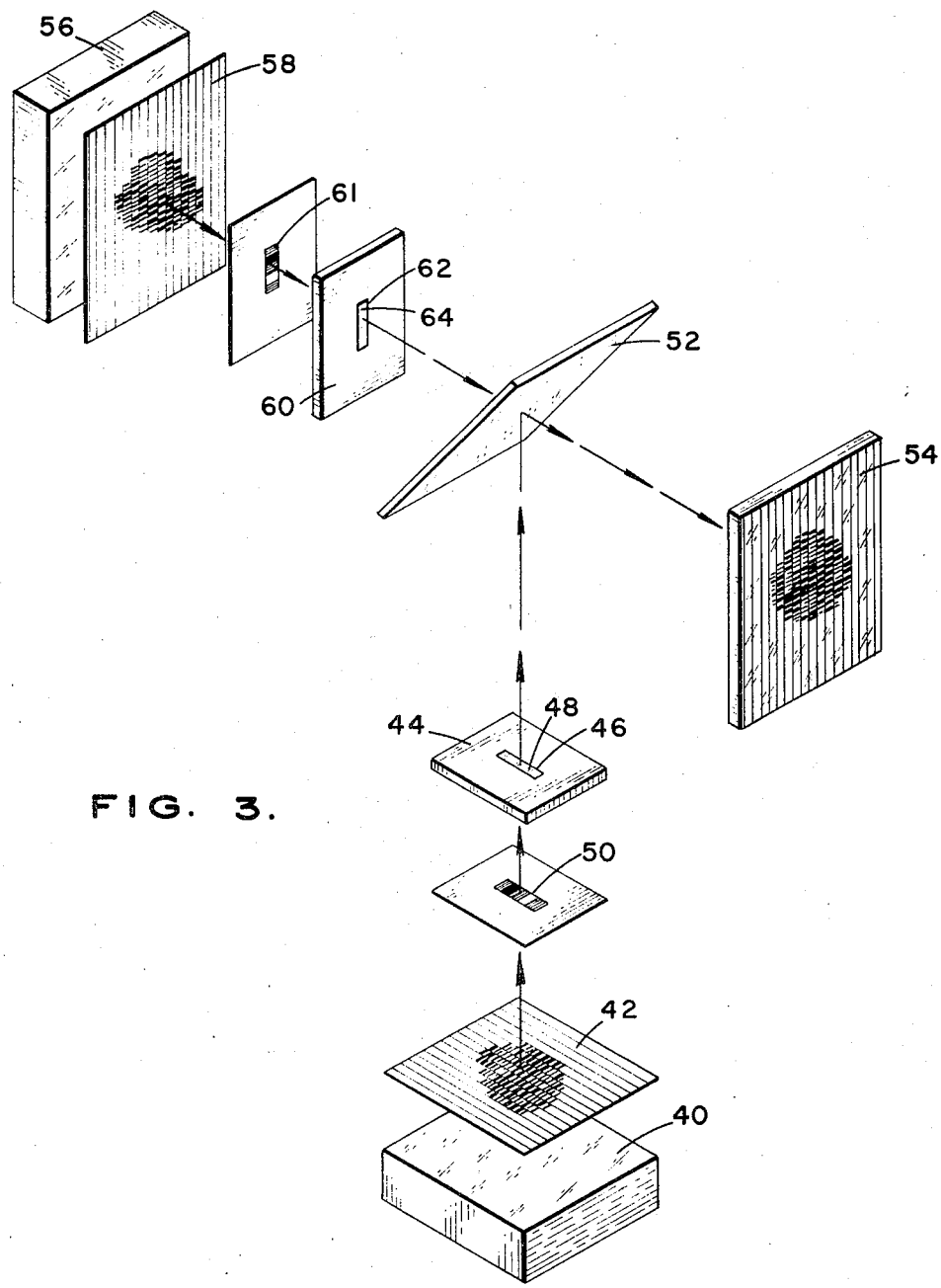
FIG. 3 illustrates an embodiment of the invention whereby one function is filtered by a second function and unwanted portions resulting from addition of a constant are removed.

In the operation of the embodiment of FIG. 2, if the filter function of the mask 26 and the variable density section 14 contain the term K (and which it usually does when used in seismic processing), then the image which appears on ground glass 28 of FIG. 2 contains the objectionable terms of Expressions 4 and 5. The second component, $$K \int_{T_1}^{T_2} [f_1(t) + f_2(\tau-t)]dt$$

is especially objectionable. The embodiment of FIG. 3 is a system in which the end result or image is such that this second component is eliminated. Attention will now be directed toward an understanding of the use of that system for removing the second of the undesirable terms in the expression, namely, $$\frac{K}{2T} \int_{T_1}^{T_2} [f_1(t) + f_2(\tau-t)]dt$$

This term is avoided by an arrangement of the optical system to cause it not to appear in the output of the system. A second data section and a second filter function are recorded or reproduced as inverted functions so that they are expressed as (6) $\qquad K - f_2(t)$ and (7) $\qquad K - f_1(\gamma - t)$ The convolution of Functions 6 and 7 is seen to be Expression 8.

(8)
$$\frac{K^2}{2T} - \frac{K}{2T}\int_{T_1}^{T_2}[f_1(t)+f_2(\tau-t)]dt + \frac{1}{2T}\int_{T_1}^{T_2}[f_1(t)f_2(\tau-t)]dt$$

By adding mathematical Expressions 5 and 8, which, as will be shown, can be done optically with the embodiment of FIG. 3, the results are:

(9)
$$\frac{1}{2T}\left[2K^2+2\int_{T_1}^{T_2}f_1(\tau-t)f_2(t)dt\right]$$

Thus the most undesirable term $$K\int_{T_1}^{T_2}[f_1(t)+f_2(\tau-t)]dt$$

does not appear in the output of the system.

FIG. 3 shows an embodiment for accomplishing this result optically. However, at this time it is believed helpful to give a simple illustration as to how these functions as shown in mathematical functions 6 and 7 are obtained. Attention is now directed back to FIG. 1. Curve D shows the function minus $f_1(\gamma-t)$. As can be seen, this is the inverted function of $f_1(\gamma-t)$. Curve E is the expression $K-f_1(\gamma-t)$ and is the inverted function of curve B, or stated differently, it is curve D plus a constant K. The variable density presentation of curve E is shown in curve F. The variable density presentation, curve F, is photographic negative of curve B which is $K+f_1(\gamma-t)$. A function $f_2(t)$ is shown in this curve G and the function $K+f_2(t)$ is shown as curve H. Curve I is a variable density presentation of curve H. Curve J shows curve G subtracted from the constant K and is therefore $K-f_2(t)$. Curve K is the variable density presentation of curve J.

Attention is now directed to FIG. 3 for an arrangement of the various films and optics so that unwanted components are eliminated. In FIG. 3 there is illustrated a first light source or box 40 upon which is placed film 42 of the function $K+f_2(\tau-t)$ in variable density form such as a seismic record. Light source 40 is of a uniform intensity, the intensity being adequate to obtain good, clear exposures. Spaced above light source 40 is an opaque light shield 44 having a slit 46 in which is placed a cylindrical lens 48 similarly as lens 20 of FIG. 2. Placed adjacent lens 48 is a mask 50 in the form of a film which contains the function $K+f_1(t)$, for example, in variable density form. The nature of the cylindrical lens 48 introduces the $\tau$ term, which is the term expressing time shift between the functions. This capacity of the cylindrical lens in the optical system is very helpful since it makes mechanical translation along the time axis unnecessary. This function $K+f_1(t)$ can be considered the filtered function. Placed at an angle of about 45° to shield 44 is a half-silvered mirror or other "light-splitting" device 52 which permits, for example, one-half of the light to pass therethrough and one-half to be reflected. One-half of the light of the image projected through lens 48 is reflected from the lower side of mirror 52 in a horizontal direction toward ground glass 54. The image which is transmitted through mask 50 to the lower side of half-silvered mirror 52 is given by mathematical Expression 5 above and whose first two components are undesirable.

Placed in a plane at approximately right angles to the plane in which light box 40 is located, is a second light source or box 56 which has placed thereon a function film 58 containing the function $K-f_2(\tau-t)$ in variable density form. Spaced from light box 56 and parallel thereto is a light shield 60 containing a slit 62 and a lens 64 similar to shield 44. A filter film 61 having the function $K-f_1(t)$ thereon in variable density form, for example, is placed adjacent lens 64. Projected onto the top side of half-silvered mirror 52 is the function $$\frac{1}{2T}\left[K^2-K\int_{T_1}^{T_2}[f_1(t)+f_2(\tau-t)]dt+\int_{T_1}^{T_2}[f_1(t)f_2(\tau-t)]dt\right]$$

as expresed before in the mathematical Expression 8.

Expressions 5 and 8 are added together by the action of half-silvered mirror 52 to obtain an image on ground glass 54 which is given by Expression 9; thus, the component $$\frac{K}{2T}\int_{T_1}^{T_2}[f_1(t)+f_2(\tau-t)]dt$$

is eliminated. The images representing Expressions 5 and 8 are placed in proper register in relation to each other and light-splitting device 52 so that proper addition will occur. The components of FIG. 3 are enclosed in a lightproof container or darkroom, not shown.

Figure 6:
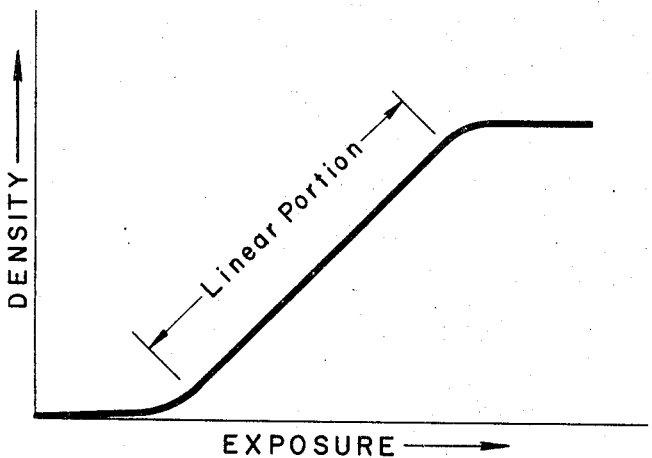
FIG. 6 represents a curve of a non-linear photographic film.
Figure 7:
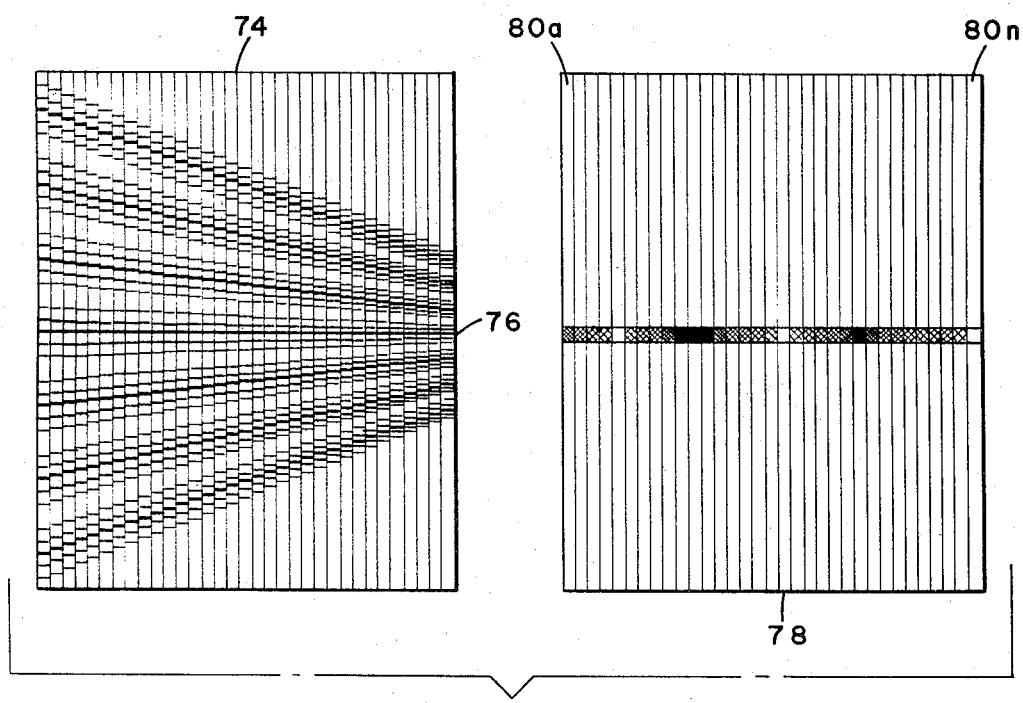
FIG. 7 illustrates film characteristics useful in using the embodiment of FIG. 3 to obtain a frequency analysis.

In some instances it is desirable to remove or reduce the effect of the term $2K^2$. This can effectively be done by the judicious selection of the density-exposure function of the film. The term $K^2$ represents a constant background level in a variable density expression of the desired function. One method for removing this background is the use of a non-linear photographic film. Such a film is of a photographic material such as to have a curve such as shown in FIG. 6 whose ordinate is density of the film and the abscissa is the intensity of exposure. By controlling the exposure so that the constant $K^2$ is suppressed by the non-linear insensitive region of the film, the desired function is printed in the essentially linear region of the film.

Figure 4:
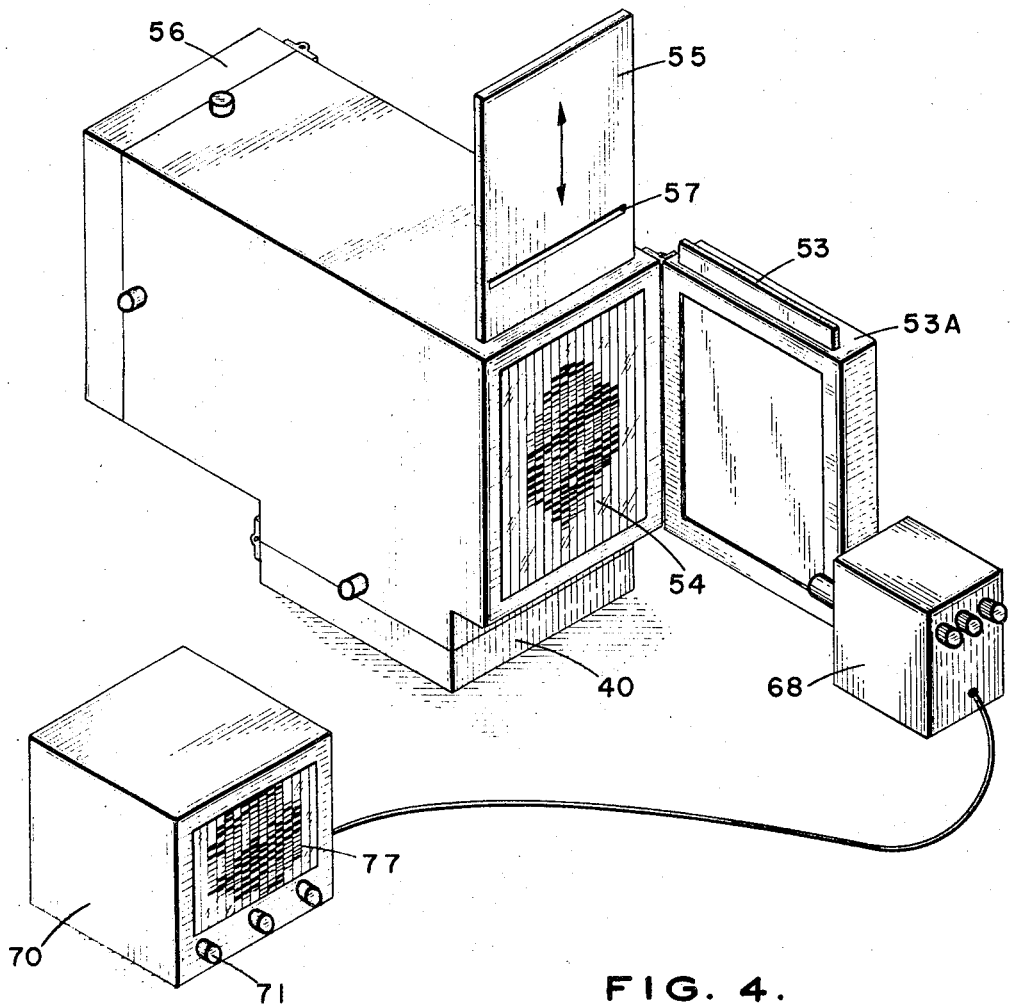
FIG. 4 illustrates modifications to the embodiment of FIG. 3.

A second system of suppressing the constant $2K^2$ value from the display on ground glass 54 is to use a closed circuit television system. This system is illustrated in FIG. 4 which shows an enclosure for the components of FIG. 3. This includes a conventional TV camera 68 connected to a display television 70 which has screen 77. The camera is placed in front of ground glass 54 and "picks up" the image displayed thereon. The contrast control 71 of the TV monitor display 70 is a non-linear control with which the $2K^2$ is suppressed. Thus, only the variations of the functions $$\frac{1}{2T}\int_{T_1}^{T_2}f_1(t)f_2(\tau-t)$$

is made visible on the viewing screen 77. The display can be viewed on the screen 77 of TV monitor set 70 or, if desired, it can be recorded by use of camera, not shown.

The apparatus of FIG. 4 includes a hinged door 53A having means to contain and hold a film 53. When it is desired to photograph the image as displayed on ground glass 54, the ground glass is removed and door 53A is shut. Film 53 is then put in place instead of ground glass 54. Light sources 40 and 56 are then energized and the resultant image as formerly projected on ground glass 54 is recorded on film 53. When it is desired to use television camera 68, door 53A is opened so that a camera has a clear view of glass 54. In FIG. 4 there is a removable plate 55 having a clear section or a rectangular slot 57. The plate 55 is raised or lowered as desired and its use will be apparent hereinafter.

Figure 5:
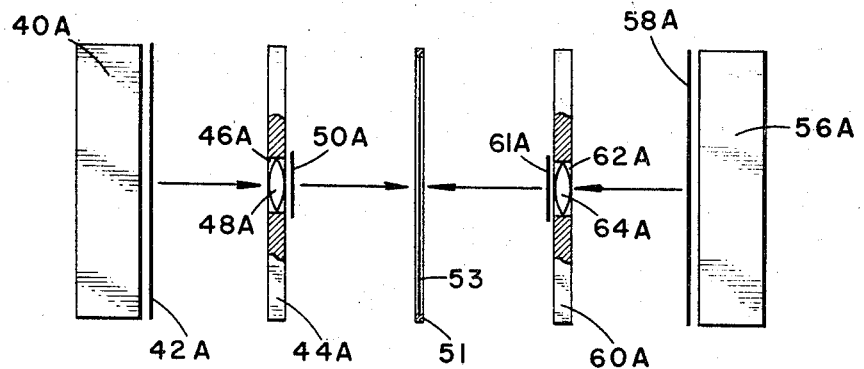
FIG. 5 is another embodiment similar to that of FIG. 3.

FIG. 5 shows a modification of the arrangement of FIG. 3. FIG. 5 can be used where it is desired to expose a film without a prior visual display. In FIG. 5 light sources 40A and 56A are parallel to each other and spaced apart. Adjacent light source 40A is film 42A having the function $K+f_2(t)$. Spaced next to light source 56A is the variable density presentation of the function $K-f_2(t)$. Approximately midway between light sources 40A and 56A is a film holder 51 for holding film 53. Spaced between film 42A and film 53 is a first opaque light shield 44A having an aperture 46A in which is mounted a lens 48A. A mask 50A having the function $K+f_1(\tau-t)$ is placed adjacent cylindrical lens 48A.

Spaced between film 58A and film 53 is a second opaque light shield 60A having an aperture 62A in which is placed a cylindrical lens 64A. Spaced adjacent cylindrical lens 64A is a second mask 61A. The whole system of FIG. 5 is enclosed in a lightproof box, not shown.

Film 53 is the type which can be exposed from either side. The left side of film 53 receives the same function as the lower side of half-silvered mirror 52 of FIG. 3, which is given by Expression 5. The right-hand side of film 53 receives the same function as the upper side of half-silvered mirror 52, which is given by Expression 8. The exposure of film 53 adds these two functions together with the result being that the undesirable function $$\frac{K}{2T}\int_{T_1}^{T_2}[f_1(\tau-t)+f_2(t)]dt$$

is cancelled. One can remove the constant $2K^2$ by using a non-linear photographic film such as described in relation to FIG. 6.

Attention will now be directed toward how the optical filtering technique used in relation to FIG. 3 is used to make a frequency analysis. In one convenient frequency analysis method, a variable density film section of oscillator traces is first made. Such a trace is illustrated on film 74. The section goes from low frequencies on the left to high frequencies on the right. As shown for illustration, there are 33 vertical columns, each of a different frequency. Each column or row is a record in variable density of a uniform sine wave for that frequency. Any useful number of vertical columns can be used as desired. The section is made such that all frequencies are in phase at the midpoint line 76. In carrying out this optical analysis, the film section 74 is used as film 42 on light box 40 of FIG. 3. The negative of the film section 74 is used as a film 58 connected with light box 56. The function to be analyzed is prepared in a positive variable density film and placed on lens 48 as film 50. The negative variable density film of the function to be analyzed is placed adjacent lens 64 as film 61.

In the consideration of the optical frequency analysis method, film 74 is seen to have the function sine wt and the function that is to be analyzed can, for convenience, be called $f_3(t)$. The action of the optical filtering system upon these two functions gives the following:

$$\frac{1}{2T}\left[K^2\int_{T_1}^{T_2}dt+K\int_{T_1}^{T_2}\sin\,wt dt+K\int_{T_1}^{T_2}f_3(t)dt+\int_{T_1}^{T_2}\sin\,wt f_3(t)dt\right]$$

which is the Fourier transform or frequency plot.

There appears on ground glass 54 then $$2K^2+2\int\sin\,wt f_3(t)$$

which is the Fourier transform. The second component $$K\int[\sin\,wt+f_3(t)]dt$$

is eliminated similarly as described above for the functions $$K+f_1(t)\text{ and }K+f_2(\tau-t)$$

Thus, there appears on ground glass 54 an image of the frequency spectrum in variable density form of the function $f_3(t)$. There are 33 vertical rows or columns on ground glass 54 similar to the columns on film 74. This is illustrated more clearly in film 78 of FIG. 6. Each column or vertical row is a constant amplitude sine wave in variable density form. A densimeter or light meter is used to determine the relative density in each vertical column. The measure of the density of a particular column is a measure of the frequency content of the signal $f_3(t)$ for the frequency assigned the particular column.

As each row $80a$ to $80n$ of film 78 is a constant amplitude sine wave, only a small section of film 78 is necessary to obtain the desired frequency spectrum. This is easily accomplished in the apparatus of FIG. 3 by inserting plate 55 having a rectangular slit 57 in front of ground glass 54 so that only a selected portion of each sine wave is transmitted to film 53 on the opposite side of ground glass 54. Thus, by the use of plate 55, only a small rectangular portion of film 53 is exposed for each function. Thus, after each analysis of $f_3(t)$, $f_4(t)$, $f_5(t)$, etc., the film can be moved to select another strip of the film for exposure during the next analysis.

It will be apparent to persons skilled in the art that many modifications of this invention are possible without departing from the spirit or scope thereof. Therefore, it is intended that the invention not be limited to the specific examples presented.

What is claimed is:

1. A method for performing a frequency analysis of a time-related function which comprises:
for a given frequency of interest in said function, preparing a variable light transmissive optical record trace of a sine wave with a given number of cycles;
preparing a first optical record by positioning said record traces in side-by-side relationship with the traces in phase at their midpoints;
preparing a second optical record of said function wherein variations in amplitude of the function are indicated by variations in light transmissivity on a photosensitive medium along a linear axis;
optically convolving the first and second optical records to obtain a third optical record;
preparing a negative of said first optical record to obtain a third optical record;
preparing a negative of said second optical record to obtain a fourth optical record;
optically convolving said third optical record with said fourth optical record to obtain a second convoluted record;
optically adding said first convoluted record and said second convoluted record to obtain a summation record; and
measuring density along said summation record to obtain the relative amplitudes of the frequency components of said function.

2. A method of filtering a first time-related function by a second time-related function comprising:
preparing an optical record trace of the first function wherein variations in amplitude of the function are indicated by variations in light transmissivity on a photosensitive medium along a time-related axis;
preparing a second optical record trace of the second function where variations in amplitude of the function are indicated by variations in light transmissivity on a photosensitive medium along a time-related axis;
for each increment of said first record trace, optically multiplying said each increment with the entirety of the second record trace, summing the products so obtained, and recording the summed products in variable light transmissivity form to obtain a third optical record trace;
preparing a negative of the first optical record to obtain a fourth optical record trace;
preparing a negative of the second optical record to obtain a fifth optical record trace;
for each increment of the fourth optical record trace optically multiplying such increment with the entirety of the fifth record trace and summing the products so obtained in variable light transmissivity form to obtain a sixth optical record trace; and
adding the third optical record trace to the sixth optical record trace to obtain a final filtered record trace.

References Cited

Cutrona et al., Data Processing by Optical Techniques from 1959 Conference Proceedings, 3rd Nat. Convention on Milit. Electronics, June 29, 1959 to July 1, 1959, pp. 23 to 26.

MALCOLM A. MORRISON, *Primary Examiner.*

FELIX D. GRUBER, *Assistant Examiner.*

U.S. Cl. X.R.

356—71; 350—162; 324—77